(12) United States Patent
Hanamura et al.

(10) Patent No.: US 9,528,455 B2
(45) Date of Patent: Dec. 27, 2016

(54) INTERNAL COMBUSTION ENGINE AND CONTROL METHOD THEREFOR

(71) Applicant: ISUZU MOTORS LIMITED, Tokyo (JP)

(72) Inventors: Yoshihumi Hanamura, Yokohama (JP); Mitsuhiro Aso, Yokohama (JP)

(73) Assignee: ISUZU MOTORS LIMITED, Tokyo (JP)

( * ) Notice: Subject to any disclaimer, the term of this patent is extended or adjusted under 35 U.S.C. 154(b) by 310 days.

(21) Appl. No.: 14/394,118

(22) PCT Filed: May 2, 2013

(86) PCT No.: PCT/JP2013/062763
§ 371 (c)(1),
(2) Date: Oct. 13, 2014

(87) PCT Pub. No.: WO2013/168674
PCT Pub. Date: Nov. 14, 2013

(65) Prior Publication Data
US 2015/0083095 A1    Mar. 26, 2015

(30) Foreign Application Priority Data

May 10, 2012  (JP) ................................. 2012-108354

(51) Int. Cl.
*F02D 41/00* (2006.01)
*F02D 41/14* (2006.01)

(52) U.S. Cl.
CPC ....... *F02D 41/0072* (2013.01); *F02D 41/0052* (2013.01); *F02D 41/1461* (2013.01);
(Continued)

(58) Field of Classification Search
CPC .............. F02D 41/0072; F02D 41/1461; F02D 41/0052; F02D 2250/36; F02D 2041/141; F02D 41/1446; F02D 41/1448; F02D 41/0077; F02M 26/40; Y02T 10/47
See application file for complete search history.

(56) References Cited

U.S. PATENT DOCUMENTS 5,931,140 A * 8/1999 Maloney ............. F02D 41/0072
                                                    123/480
6,035,640 A * 3/2000 Kolmanovsky ......... F02B 37/24
                                                    123/676
(Continued)

FOREIGN PATENT DOCUMENTS

FR      2956160       8/2011
JP      8-232771      9/1996
(Continued)

OTHER PUBLICATIONS

International Search Report mailed Aug. 6, 2013, in corresponding International Patent Application No. PCT/JP2013/062763.

*Primary Examiner* — Hung Q Nguyen
(74) *Attorney, Agent, or Firm* — Staas & Halsey LLP

(57) ABSTRACT

An internal combustion engine includes an Exhaust Gas Recirculation (EGR) system having an EGR valve and a reed valve in an EGR passage, and a control device that expresses a relationship between an opening degree of the EGR valve and a mass flow rate of an EGR gas by using a first volume flow rate of the EGR gas that can be expressed by using an isentropic flow equation of a nozzle of the EGR valve and a second volume flow rate of the EGR gas pumped out by the reed valve. Even if the reed valve (check valve) is provided in the EGR passage, the mass flow rate of the EGR gas can be calculated accurately.

8 Claims, 6 Drawing Sheets

(52) U.S. Cl.
CPC ......... *F02M 26/40* (2016.02); *F02D 41/0077* (2013.01); *F02D 41/1446* (2013.01); *F02D 41/1448* (2013.01); *F02D 2041/141* (2013.01); *F02D 2250/36* (2013.01); *Y02T 10/47* (2013.01)

(56) References Cited

U.S. PATENT DOCUMENTS

2003/0188571 A1\* 10/2003 Wright ............... F02D 41/1448
 73/114.16
2006/0037310 A1  2/2006 Sakata et al.
2009/0000367 A1  1/2009 Ohata

FOREIGN PATENT DOCUMENTS

| | | |
|---|---|---|
| JP | 10-18918 | 1/1998 |
| JP | 2002-106422 | 4/2002 |
| JP | 2002-130029 | 5/2002 |
| JP | 2010-144700 | 7/2010 |
| WO | 2008/107247 A1 | 9/2008 |

\* cited by examiner

INTERNAL COMBUSTION ENGINE AND CONTROL METHOD THEREFOR

CROSS-REFERENCE TO RELATED APPLICATIONS

This application is a U.S. National Stage Application, which claims the benefit under 35 U.S.C. §371 of PCT International Patent Application No. PCT/JP2013/062763, filed May 2, 2013, which claims the foreign priority benefit under 35 U.S.C. §119 of Japanese Patent Application No. 2012-108354, filed May 10, 2012, the contents of which are incorporated herein by reference.

TECHNICAL FIELD

The present invention relates to an internal combustion engine provided with an EGR (Exhaust Gas Recirculation) system and controlling a flow rate of a recirculating EGR gas and a control method therefor.

BACKGROUND ART

In a prior-art technology, an EGR (Exhaust Gas Recirculation) system is provided in order to suppress NOx (nitrogen oxides) low in an exhaust gas of an internal combustion engine such as a diesel engine. At this time, a detectable physical amount is fed back and a mass flow rate of the recirculating EGR gas is adjusted by controlling an EGR valve provided in an EGR passage so that the physical amount matches a target value of the physical amount determined in advance.

Thus, there is a device which converts a target exhaust recirculating amount set as a mass flow rate to a volume flow rate and determines a target area of the exhaust recirculating path on the basis of the target exhaust recirculating amount as the volume flow rate (see Patent Document 1, for example). This device can set the mass flow rate of the exhaust gas in accordance with an operation condition and can achieve highly accurate control of the target area of the exhaust recirculating path.

Since the volume flow rate of the EGR gas is in proportion to ½ power of a before and after differential pressure in a certain passage area of the exhaust recirculating path, the above-described device acquires the target area that can obtain the target exhaust recirculating amount on the basis of the target exhaust recirculating amount as the volume flow rate and a differential pressure between an intake pressure and an exhaust pressure.

In the current technology, it is difficult to directly detect the mass flow rate of the EGR gas and thus, the mass flow rate of the EGR gas is calculated with a control logic of an internal calculation model which acquires an engine intake/exhaust system state amount by calculation as in the above-described device.

Usually, since the mass flow rate of the EGR gas passing through the EGR valve can be handled as an isentropic flow of a nozzle, it can be expressed by Formula (8) below.

[Formula 8]

$$m_{egr} = \mu \cdot A \cdot \frac{P_{in}}{\sqrt{R \cdot T_{in}}} \sqrt{\frac{2k}{k-1} \cdot \left[ \left(\frac{P_{out}}{P_{in}}\right)^{\frac{2}{k}} - \left(\frac{P_{out}}{P_{in}}\right)^{\frac{k+1}{k}} \right]} \quad (8)$$

Here, it is assumed that $m_{egr}$ is a mass flow rate ([kg/s]) of the EGR gas passing through the EGR valve, $\mu$ is a flow rate coefficient ([-]), A is an effective opening area ([m$^2$]) of the EGR valve, $P_{in}$ is a pressure at the EGR valve inlet ([Pa]), $P_{out}$ is a pressure at the EGR valve outlet ([Pa]), $T_{in}$ is a temperature at the EGR valve inlet ([K]), R is a gas constant ([J/kgK]), and k is a specific heat ratio ([-]).

By experimentally acquiring $\mu \cdot A$ obtained by multiplying the flow rate coefficient $\mu$ of the EGR gas by the effective opening area A of the EGR valve (hereinafter referred to as a coefficient of an isentropic flow of the nozzle), it can be expressed as a function of an EGR valve opening degree $x_{egr}$ and an inter-valve differential pressure $P_{in}$-$P_{out}$ by Formula (9) below.

[Formula 9]

$$\mu \cdot A = f(x_{egr}, P_{in} - P_{out}) \quad (9)$$

This function is substantially given as an interpolation value from a map acquired from an experiment result in advance.

Depending on an engine specification, a differential pressure between an inlet and an outlet of the EGR valve is small and becomes negative depending on an operation state. In such an engine, a reed valve (check valve) is provided in the EGR passage in order to prevent a backflow of the EGR gas and also, the EGR gas is pumped out by using periodic differential pressure fluctuation generated by pulsation of a cylinder intake/exhaust stroke.

In the state in which the differential pressure between the inlet and the outlet of the EGR valve is small or becomes negative as above, the reed valve effectively works and a flow of the EGR gas is generated by a pumping operation of pumping out the EGR gas and thus, the mass flow rate cannot be expressed by the isentropic flow of the nozzle and cannot be calculated by the above-described formula (8).

Moreover, the above-described method in Patent Document 1 is also a method for control on the basis of the target exhaust recirculating amount as the volume flow rate and a differential pressure between the intake pressure and the exhaust pressure, but since its condition is that the mass flow rate of the EGR gas can be expressed by the isentropic flow of the nozzle, it cannot be applied to the internal combustion engine provided also with the reed valve.

PRIOR ART DOCUMENT

Patent Documents

Patent Document 1: Japanese patent application Kokai publication No. 10-18918

SUMMARY OF THE INVENTION

The present invention was made in view of the above-described problems and has an object to provide an internal combustion engine which can calculate amass flow rate of the EGR gas with accuracy even if a reed valve (check valve) is provided in the EGR passage and a control method therefor.

Means for Solving the Problems

An internal combustion engine of the present invention in order to solve the above-described object is an internal combustion engine including an EGR system having an EGR valve and a check valve in an EGR passage, and configured by including a control device expressing a relationship between an opening degree of the EGR valve and a mass flow rate of an EGR gas by using a first volume flow rate of the EGR gas that can be expressed by using an isentropic flow equation of a nozzle of the EGR valve and a second volume flow rate of the EGR gas pumped out by the check valve.

According to this configuration, the check valve is provided in the EGR passage, and even if the mass flow rate of the EGR gas cannot be expressed only by the isentropic flow of the nozzle, the relationship between the opening degree of the EGR valve and the mass flow rate of the EGR gas can be accurately expressed.

Moreover, in the above-described internal combustion engine, the control device is provided with the following Formula (1) which expresses the first volume flow rate ($V_1$) and is obtained by dividing the isentropic flow equation of the nozzle by a gas density, and the following Formula (2) which expresses the second volume flow rate ($V_2$) and is obtained by multiplying an EGR gas pumped-out volume flow rate ($V_{egr\_pump}$) per cylinder by the number of differential pressure fluctuation times per unit time.

[Formula 1]

$$V_1 = \mu \cdot A \cdot \sqrt{\frac{2k}{k-1} \cdot R \cdot T_{in} \cdot \left[\left(\frac{P_{out}}{P_{in}}\right)^{\frac{2}{k}} - \left(\frac{P_{out}}{P_{in}}\right)^{\frac{k+1}{k}}\right]} \quad (1)$$

[Formula 2]

$$V_2 = V_{egr\_pump} \cdot \frac{n_{eng}}{60} \cdot \frac{B}{N_{cyl}} \quad (2)$$

Here, it is assumed that a flow rate coefficient is $\mu([-])$, an effective opening area of the EGR valve is A ($[m^2]$), a pressure at an EGR valve inlet is $P_{in}$ ([Pa]), a pressure at an EGR valve outlet is $P_{out}$ ([Pa]), a temperature at the EGR valve inlet is $T_{in}$ ([K]), a gas specific heat is R ([J/kgK]), a specific heat ratio is k ([-]), an engine speed is $n_{eng}$ ([rpm]), a value acquired from a crank type is B ([-]), and the number of cylinders is $N_{cyl}$ ([-]).

The value B acquired from the crank type here is a value which becomes 360/α if the crank type is α° crank. For example, if a cylinder arrangement of an internal combustion engine is an inline four-cylinder type, the crank type is 180° crank and the value is two, or in the case of an inline six-cylinder type, the crank type is 120° crank and the value is three.

According to this configuration, the mass flow rate of the EGR gas can be accurately calculated from the opening degree of the EGR valve or the opening degree of the EGR valve can be accurately calculated from the mass flow rate of the EGR gas. As a result, even in the internal combustion engine provided with a check valve in the EGR passage, the mass flow rate of the EGR gas can be controlled.

In addition, in the above-described internal combustion engine, when the control device controls the EGR valve to an opening degree ($x_{egr}$) according to a target value of a state amount of the internal combustion engine, if the control device is provided with: a first device configured to acquire a coefficient ($\mu \cdot A$) of the isentropic flow equation of the nozzle according to the opening degree ($x_{egr}$) and a current pressure ratio ($P_{out}/P_{in}$) from a first opening map of the EGR valve on the basis of the coefficient of the isentropic flow equation of the nozzle and before and after pressure ratios of the EGR valve and to calculate the first volume flow rate ($V_1$) from the Formula (1); a second device configured to acquire a pumped-out volume flow rate ($V_{egr\_pump}$) of the EGR gas per cylinder of the internal combustion engine according to the opening degree ($x_{egr}$) and the current pressure ratio ($P_{out}/P_{in}$) from a second opening map of the EGR valve on the basis of the pumped-out volume flow rate of the EGR gas per cylinder and the before and after pressure ratios of the EGR valve and to calculate the second volume flow rate ($V_2$) from the Formula (2); and after the first device and the second device, a third device configured to calculate the mass flow rate ($m_{egr}$) by multiplying the larger one of the first volume flow rate ($V_1$) and the second volume flow rate ($V_2$) by the gas density, the mass flow rate of the EGR gas can be accurately calculated from the opening degree of the EGR valve. As a result, since above-described calculation model of the mass flow rate of the EGR gas can be used for so-called a feedback control, controllability of the EGR system can be improved.

Moreover, in the above-described internal combustion engine, when the control device controls the EGR valve so as to have the mass flow rate ($m_{egr}$) of the EGR gas according to the target value of the state amount of the internal combustion engine, if the control device is further provided with: when the value calculated by dividing the mass flow rate ($m_{egr}$) by the gas density is used as the first volume flow rate ($V_1$) and the second volume flow rate ($V_2$) a fourth device configured to acquire a first target opening degree ($x_{egr\_1}$) according to a coefficient ($\mu \cdot A$) of an isentropic flow equation of the nozzle calculated by the Formula (1) from the first volume flow rate ($V_1$) and the current pressure ratio ($P_{out}/P_{in}$) from a first opening map of the EGR valve on the basis of the coefficient of the isentropic flow equation of the nozzle and the before and after pressure ratios of the EGR valve; a fifth device configured to acquire a second target opening degree ($x_{egr\_2}$) according to the pumped-out volume flow rate ($V_{egr\_pump}$) of the EGR gas per cylinder calculated by the Formula (2) from the second volume flow rate ($V_2$) and the current pressure ratio ($P_{out}/P_{in}$) from a second opening map of the EGR valve on the basis of the pumped-out volume flow rate of the EGR gas per cylinder and the before and after pressure ratios of the EGR valve; and after the fourth device and the fifth device, a sixth device configured to set the smaller one of the first target opening degree ($x_{egr\_1}$) and the second target opening degree ($x_{egr\_2}$) to the opening degree ($x_{egr}$), the opening degree of the EGR valve can be accurately calculated from the required mass flow rate of the EGR gas. As a result, since above-described calculation model of the opening degree of the EGR valve can be used for so-called a feed-forward control, controllability of the EGR system can be further improved.

According to the present invention, even if the reed valve (check valve) is provided in the EGR passage, the mass flow rate of the EGR gas can be calculated with accuracy. As a result, it can be applied to the EGR control having a mass flow rate calculation model of the EGR gas, and controllability can be improved. Moreover, since an opening degree calculation model of the EGR valve can be also acquired easily, it can be utilized not only for the feedback control but also for the feed-forward control, and controllability can be further improved.

BRIEF DESCRIPTION OF THE DRAWINGS

FIGS. 5(a) and 5(b) are graphs illustrating a first opening map and a second opening map, in which FIG. 5(a) is the first opening map illustrating an opening degree of the EGR valve on the basis of a coefficient of an isentropic flow equation of a nozzle of the EGR valve and an inlet/outlet pressure ratio of the EGR valve, and FIG. 5(b) is a second opening map illustrating the opening degree of the EGR valve on the basis of an EGR gas pumped-out volume flow rate per cylinder and the inlet/outlet pressure ratio of the EGR valve.

DETAILED DESCRIPTION

An internal combustion engine of an embodiment according to the present invention and a control method therefor will be explained below by referring to the attached drawings. This embodiment uses an in-line 4-cylinder diesel engine as an example, but the present invention is not limited to the diesel engine but can be also applied to a gasoline engine, and the number of cylinders or arrangement of the cylinders is not limited. In the attached drawings, dimensions are changed in order to facilitate understanding of a configuration, and a ratio of a plate thickness, a width, a length and the like of each member or each component are not necessarily matched with a ratio of those actually manufactured.

Figure 1:
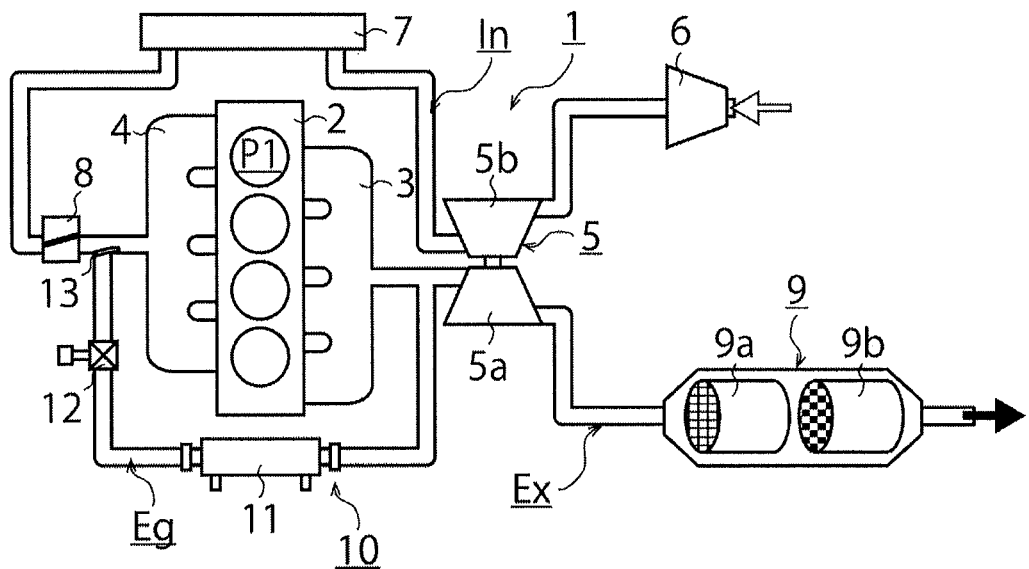
FIG. 1 is a plan view illustrating an internal combustion engine of an embodiment according to the present invention.

First, the internal combustion engine of a first embodiment according to the present invention will be explained by referring to FIGS. 1 and 2. As illustrated in FIG. 1, an engine (internal combustion engine) 1 includes an engine body 2, an exhaust passage Ex, an intake passage In, and an EGR (Exhaust Gas Recirculation) passage Eg, and further includes an exhaust manifold 3, an inlet manifold 4, a turbocharger 5 composed of a variable turbine 5a and a compressor 5b, an air cleaner 6, an intercooler 7, an intake throttle 8, a post-treatment device 9 composed of a DOC (Diesel Oxidation Catalyst) 9a and a DPF (Diesel particulate Filter) 9b, and an EGR (Exhaust Gas Recirculation) system 10.

Moreover, this engine 1 includes an EGR cooler 11, an EGR valve (EGR valve) 12, and a reed valve (check valve) 13 in the EGR system 10.

Figure 2:
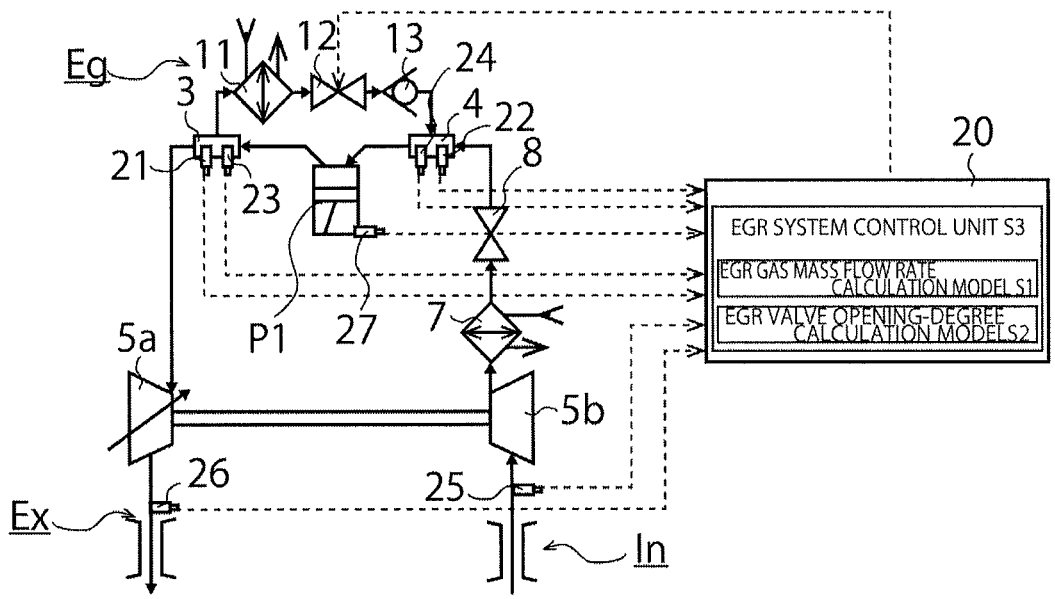
FIG. 2 is an outline view illustrating control of the internal combustion engine illustrated in FIG. 1.

In addition, as illustrated in FIG. 2, this engine 1 includes an ECU (control unit) 20 called an engine control unit. It also includes a first pressure sensor (a pressure sensor at an inlet of the EGR valve 12) 21, a second pressure sensor (a pressure sensor at an outlet of the EGR valve 12) 22, a first temperature sensor 23 (a temperature sensor at the inlet of the EGR valve 12), a second temperature sensor (a temperature sensor at the outlet of the EGR valve 12) 24, a MAF sensor (intake air amount sensor) 25, a NOx sensor 26, and a crank angle sensor 27.

This ECU 20 is a microcontroller for comprehensively executing electric control in charge of control of the engine 1 by an electric circuit, includes an EGR system control unit S3 having an EGR gas mass flow rate calculation model S1 and an EGR valve opening-degree calculation model S2, and controls an opening degree of the EGR valve 12 on the basis of a signal detected by each of the sensors 21 to 27.

This engine 1 includes a so-called high-pressure type EGR system 10 for recirculating the EGR gas from an exhaust gas upstream side of the turbocharger 5 and thus, a differential pressure at the inlet/outlet of the EGR valve 12 becomes small or negative depending on an operation state. Thus, by providing a reed valve 13 in the EGR passage Eg in order to prevent a backflow of the EGR gas, and the EGR gas can be pumped out by using periodic differential pressure fluctuation generated by pulsation of a cylinder intake/exhaust stroke.

However, since this engine 1 includes the reed valve 13 in the EGR passage Eg, a mass flow rate of the EGR gas cannot be calculated accurately with a prior-art method. Thus, in the present invention, in the engine 1 having the reed valve 13 in the EGR passage Eg, a method for calculating the mass flow rate of the EGR gas is used. This method will be explained.

Figure 3:
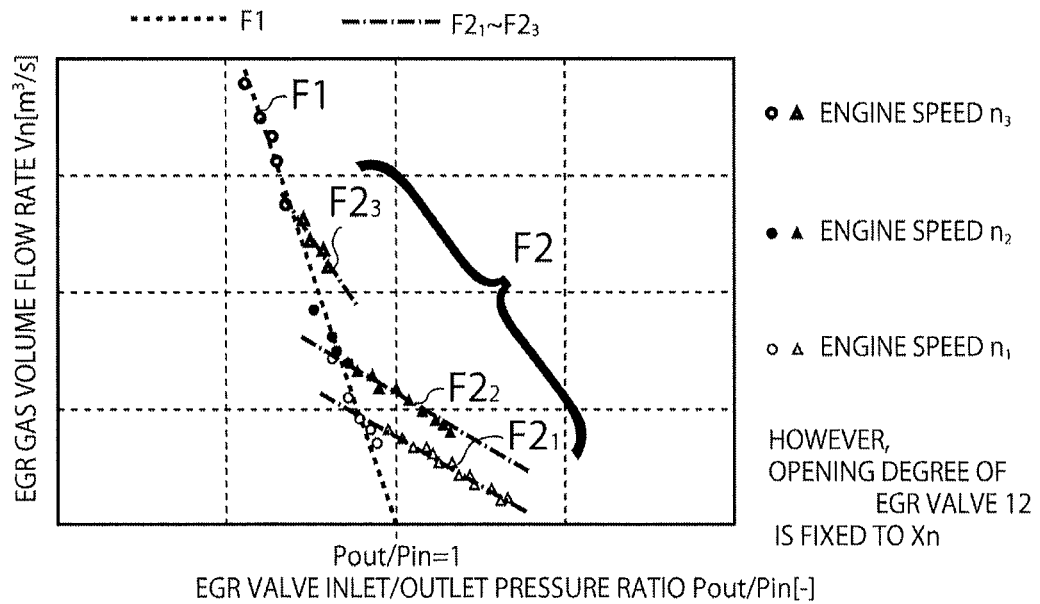
FIG. 3 is a graph obtained by measuring a volume flow rate of an EGR gas when an opening degree of an EGR valve of the internal combustion engine illustrated in FIG. 1 is made constant and illustrates a volume flow rate that can be expressed by an isentropic flow of a nozzle and a volume flow rate pumped out by a reed valve.
Figure 4:
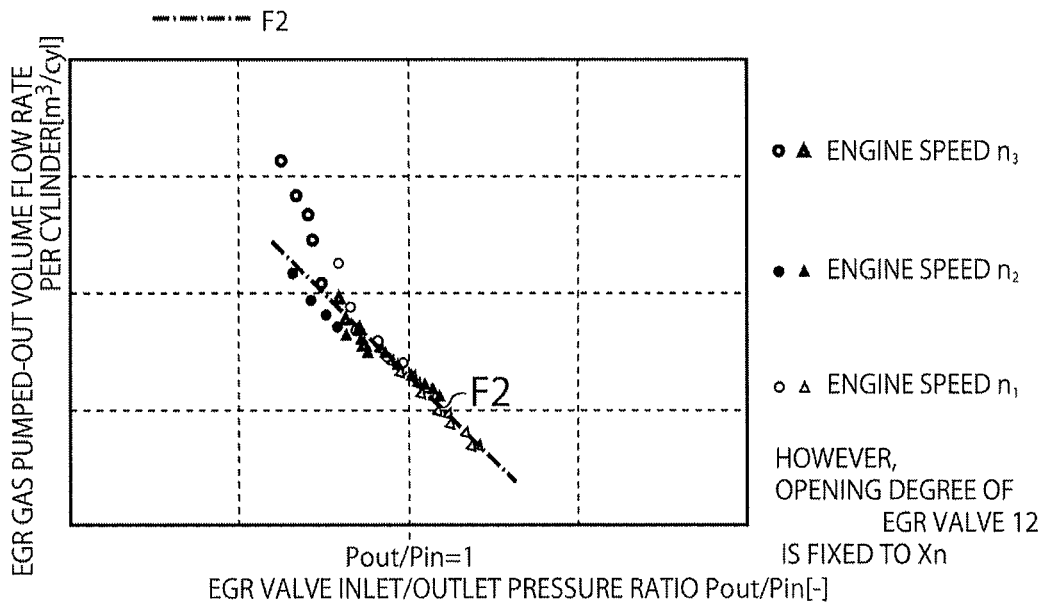
FIG. 4 is a graph obtained by measuring a pumped-out volume flow rate of the EGR gas per cylinder when the opening degree of the EGR valve of the internal combustion engine illustrated in FIG. 1 is made constant.

Here, a result of measurement of a volume flow rate of the EGR gas is illustrated in FIG. 3 and FIG. 4. FIG. 3 is obtained by plotting the volume flow rate $V_{egr}$ of the EGR gas when the opening degree of the EGR valve 12 is fixed to a threshold value $x_n$ and a pressure ratio $P_{out}/P_{in}$ at the inlet/outlet of the EGR valve 12 is changed according to engine speeds $n_1$, $n_2$, and $n_3$. FIG. 4 is obtained by plotting a pumped-out volume flow rate $V_{egr\_pump}$ of the EGR gas per cylinder when the opening degree of the EGR valve 12 is fixed to a threshold value $x_n$ and the pressure ratio $P_{out}/P_{in}$ at the inlet/outlet of the EGR valve 12 is changed according to engine speeds $n_1$, $n_2$, and $n_3$.

As illustrated in FIG. 3, tendencies of the pressure ratio $P_{out}/P_{in}$ and the volume flow rate $V_{egr}$ of the EGR gas can be classified into two classes. In a tendency F1 in the figure, the volume flow rate $V_{egr}$ linearly decreases as the pressure ratio $P_{out}/P_{in}$ increases, and the volume flow rate $V_{egr}$ becomes zero when the pressure ratio $P_{out}/P_{in}$ is one. This tendency F1 is on the same line even in the different engine speeds $n_1$, $n_2$, and $n_3$, and though not shown in this figure, if the opening degree $x_n$ of the EGR valve 12 is different, the inclination also becomes different.

That is, the tendency F1 depends on the opening degree $x_n$ of the EGR valve 12 and the pressure ratio $P_{out}/P_{in}$, and this is a phenomenon that can be expressed by using an isentropic flow equation of a nozzle of the EGR valve 12.

On the other hand, the tendencies $F2_1$ to $F2_3$ are tendencies generated if the pressure difference between the inlet and the outlet of the EGR valve 12 is small or negative in one vicinity of the pressure ratio $P_{out}/P_{in}$, and the volume flow rate $V_{egr}$ decreases linearly with the increase of the pressure ratio $P_{out}/P_{in}$, but the line is offset by the engine speeds $n_1$, $n_2$, and $n_3$.

When this volume flow rate $V_{egr}$ is expressed by the pumped-out volume flow rate of the EGR gas per cylinder (also called the volume flow rate of the EGR gas pumped out by pumping) $V_{egr\_pump}$, it is shown in FIG. 4, and it changes on the same line not depending on the engine speeds $n_1$, $n_2$, and $n_3$. Though not shown in this figure, the lines become different if the opening degree $x_n$ of the EGR valve 12 is different.

That is, the tendency F2 is a phenomenon in which the reed valve 13 effectively works, and the EGR gas is pumped out by using periodic differential pressure fluctuation generated by pulsation of the cylinder intake/exhaust stroke.

Regarding the mass flow rate $m_{egr}$ ([kg/s]) of the EGR gas of the engine 1 having the reed valve 13 in the EGR passage Eg, the following Formula (3) holds.

[Formula 3]

$$m_{egr} = \frac{P_{in}}{R \cdot T_{in}} \cdot V_{egr} \qquad (3)$$

Here, it is assumed that the pressure at the inlet of the EGR valve 12 is $P_{in}$ ([Pa]), the inlet temperature of the EGR valve 12 is $T_{in}$ ([K]), the gas constant is R ([J/kgK]), and the volume flow rate of the EGR gas is $V_{egr}$ ([m$^3$/s]).

The EGR gas volume flow rate $V_{egr}$ can be expressed from FIG. 3 and FIG. 4 by the maximum values of the tendency F1, that is, the first volume flow rate $V_1$ that can be expressed by using the isentropic flow equation of the nozzle of the EGR valve 12 and the tendency F2, that is, the second volume flow rate $V_2$ pumped out by the reed valve 13 and can be expressed by Formula (4) shown below.

[Formula 4]

$$V_{egr} = \max(V_1, V_2) \qquad (4)$$

The first volume flow rate $V_1$ can be expressed by the Formula (1) shown below obtained by dividing the isentropic flow equation of the nozzle of the EGR valve 12.

[Formula 1]

$$V_1 = \mu \cdot A \cdot \sqrt{\frac{2k}{k-1} \cdot R \cdot T_{in} \cdot \left[\left(\frac{P_{out}}{P_{in}}\right)^{\frac{2}{k}} - \left(\frac{P_{out}}{P_{in}}\right)^{\frac{k+1}{k}}\right]} \qquad (1)$$

Here, it is assumed that $\mu$ is the flow rate coefficient ([-]), A is the effective opening area ([m$^2$]) of the EGR valve 12, $P_{in}$ is the pressure at an inlet of the EGR valve 12 ([Pa]), $P_{out}$ is the pressure at an outlet of the EGR valve 12 ([Pa]), and k is the specific heat ratio ([-]).

A product of the flow rate coefficient $\mu$ and the effective opening area A of the EGR valve 12, that is, a coefficient $\mu \cdot A$ of the isentropic flow equation of the nozzle in the Formula (1) (hereinafter referred to as the coefficient $\mu \cdot A$) is acquired experimentally and can be expressed by Formula (5) shown below.

[Formula 5]

$$\mu \cdot A = f\left(x_{egr}, \frac{P_{out}}{P_{in}}\right) \qquad (5)$$

A map that can be expressed by this Formula (5) is assumed to be a first opening map M1 illustrated in FIG. 5(a). This first opening map M1 is a map expressing the pressure ratio ($P_{out}/P_{in}$) at the inlet/outlet of the EGR valve 12 and the opening degrees $x_{n-1}$, $x_{n-2}$, and $x_{n-3}$ of the EGR valve 12 on the basis of the coefficient $\mu \cdot A$. If the opening degrees $x_{n-1}$, $x_{n-2}$, and $x_{n-3}$ of the EGR valve 12 are different, the slopes become different.

The second volume flow rate $V_2$ can be expressed by the Formula (2) shown below assuming that the pumped-out volume flow rate of the EGR gas per cylinder is $V_{egr\_pump}$.

[Formula 2]

$$V_2 = V_{egr\_pump} \cdot \frac{n_{eng}}{60} \cdot \frac{B}{N_{cyl}} \qquad (2)$$

Here, it is assumed that the engine speed is $n_{eng}$ ([rpm]), the value acquired from a crank type is B ([-]), and the number of cylinders of the engine body 2 is $N_{cyl}$ ([-]). The value B acquired from the crank type of this embodiment becomes $360/\alpha$ if the crank type is $\alpha°$ crank. In this embodiment, since a cylinder arrangement of the engine 1 is an inline four-cylinder type and the crank type is 180° crank, the value is two, but in the case of an inline six-cylinder type, the crank type is 120° crank, and the value is three.

It is only necessary that this Formula (2) is a product of the pumped-out volume flow rate $V_{egr\_pump}$ of the EGR gas per cylinder and the number of times of periodic differential pressure fluctuation generated by pulsation of the cylinder intake/exhaust stroke performed in one second.

The pumped-out volume flow rate $V_{egr\_pump}$ of the EGR gas per cylinder can be acquired experimentally and can be expressed by Formula (6) shown below.

[Formula 6]

$$V_{egr\_pump} = f\left(x_{egr}, \frac{P_{out}}{P_{in}}\right) \qquad (6)$$

A map that can be expressed by this Formula (6) is assumed to be a second opening map M2 illustrated in FIG. 5(b). This second opening map M2 is a map expressing the pressure ratio ($P_{out}/P_{in}$) at the inlet/outlet of the EGR valve 12 and the opening degrees $x_{n-1}$, $x_{n-2}$, and $x_{n-3}$ of the EGR valve 12 on the basis of the pumped-out volume flow rate $V_{egr\_pump}$ of the EGR gas per cylinder. If the opening degrees $x_{n-1}$, $x_{n-2}$, and $x_{n-3}$ of the EGR valve 12 are different, the lines become different.

According to the above-described configuration, by providing the reed valve 13 on the EGR passage Eg, the volume flow rate $V_{egr}$ of the EGR gas changing between the two tendencies F1 and F2 can be expressed by the volume flow rate $V_1$ that can be expressed by the tendency F1 and the volume flow rate $V_2$ that can be expressed by the tendency F2, and thus, the mass flow rate $m_{egr}$ of the EGR gas can be calculated accurately.

Figure 5:
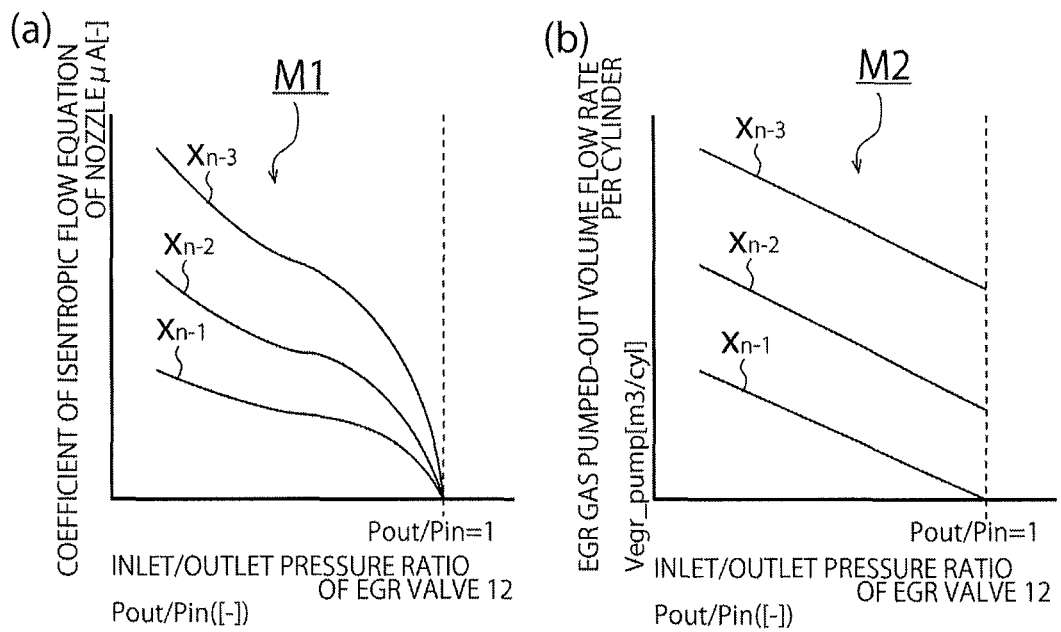

Subsequently, the EGR gas mass flow rate calculation model S1 (a method for calculating the mass flow rate $m_{egr}$ of the EGR gas from the opening degree $x_{egr}$ of the EGR valve 12) using the above-described Formulas (1) to (6), the first opening map M1 illustrated in FIG. 5 (a), and the second opening map M2 illustrated in FIG. 5 (b) will be explained by referring to FIG. 6. Numerals (1) to (4) in the figure indicate the above-described Formulas (1) to (4).

First, in this mass flow rate calculation model S1, the opening degree $x_{egr}$ of the EGR valve 12 according to a target value of a state amount of the engine 1 (a NOx exhaust amount detected by the NOx sensor 26, for example), the pressure $P_{out}$ at the outlet of the EGR valve 12 detected by the second pressure sensor 22, the pressure $P_{in}$ at the inlet of the EGR valve 12 detected by the first pressure sensor 21, the temperature $T_{in}$ at the inlet of the EGR valve 12 detected by the first temperature sensor 23, and the engine speed $n_{eng}$ detected by the crank angle sensor 27 are inputted.

Subsequently, by referring to the first opening map M1, the coefficient μ·A of the isentropic flow equation of the nozzle according to the opening degree $x_{egr}$ of the EGR valve 12 and the pressure ratio $P_{out}/P_{in}$ at the inlet/outlet of the EGR valve 12 is calculated. Subsequently, the first volume flow rate $V_1$ is calculated from the above-described Formula (1).

On the other hand, by referring to the second opening map M2, the pumped-out volume flow rate $V_{egr\_pump}$ of the EGR gas per cylinder according to the opening degree $x_{egr}$ of the EGR valve 12 and the pressure ratio $P_{out}/P_{in}$ at the inlet/outlet of the EGR valve 12 is calculated. Subsequently, the second volume flow rate $V_2$ is calculated from the above-described Formula (2).

Subsequently, from the above-described Formula (4), the larger one of the first volume flow rate $V_1$ and the second volume flow rate $V_2$ is set to the volume flow rate $V_{egr}$ of the EGR gas, and the mass flow rate $m_{egr}$ of the EGR gas is calculated from the above-described Formula (3).

According to this EGR gas mass flow rate calculation model S1, even if the reed valve 13 is provided in the EGR passage Eg, the mass flow rate $m_{egr}$ of the EGR gas can be calculated by the first volume flow rate $V_1$ that can be expressed by using the isentropic flow equation of the nozzle of the EGR valve 12 and the second volume flow rate $V_2$ pumped out by the periodic differential pressure fluctuation generated by the pulsation of the cylinder intake/exhaust stroke, that is, the pumping operation.

As a result, since the mass flow rate $m_{egr}$ of the EGR gas can be calculated accurately from the opening degree $x_{egr}$ of the EGR valve 12, it can be applied to a control of the EGR valve 12 having the EGR gas mass flow rate calculation model S1, and controllability can be improved.

For example, in control of the EGR system 10 having the NOx exhaust amount $m_{NOx}$ detected by the NOx sensor 26 as a control amount, it is assumed that the target value is set as a target intake oxygen concentration $m_{o2\_dem}$ that can suppress the NOx exhaust amount $m_{NOx}$, and an intake air amount $m_{air}$ detected by the MAF sensor 25 and the mass flow rate $m_{egr}$ of the EGR gas calculated in the mass flow rate calculation model S1 of the EGR gas are used as detectable physical amounts.

First, the opening degree $x_{egr}$ of the EGR valve 12 according to the target intake oxygen concentration $m_{o2\_dem}$ for suppressing the NOx exhaust amount $m_{NOx}$ low is determined, and the ECU 20 controls the EGR valve 12. Subsequently, an actual intake oxygen concentration $m_{o2}$ is calculated from the intake air amount $m_{air}$ detected by the MAF sensor 25 and the mass flow rate $m_{egr}$ of the EGR gas calculated in the mass flow rate calculation model S1, and the value is fed back. The opening degree $x_{egr}$ of the EGR valve 12 is adjusted from a deviation between the target intake oxygen concentration $m_{o2\_dem}$ and the actual intake oxygen concentration $m_{o2}$.

By means of the above-described operation, the EGR valve 12 is controlled in accordance with the target value of the state amount (NOx exhaust amount, for example) of the engine 1, the detectable physical amount changing with the control is fed back, and the EGR system 10 can be controlled so that the predetermined target value of the physical amount is matched, whereby controllability of the EGR system 10 can be improved.

Subsequently, the EGR valve opening-degree calculation model (method for calculating the opening degree $x_{egr}$ of the EGR valve 12 from the mass flow rate $m_{egr}$ of the EGR gas) S2 which is a reverse model of the above-described EGR gas mass flow rate calculation model S1 will be explained by referring to FIG. 7. Numerals (1), (2), (3), and (7) in the figure indicate the above-described Formulas (1), (2), (3), and (7).

Figure 7:
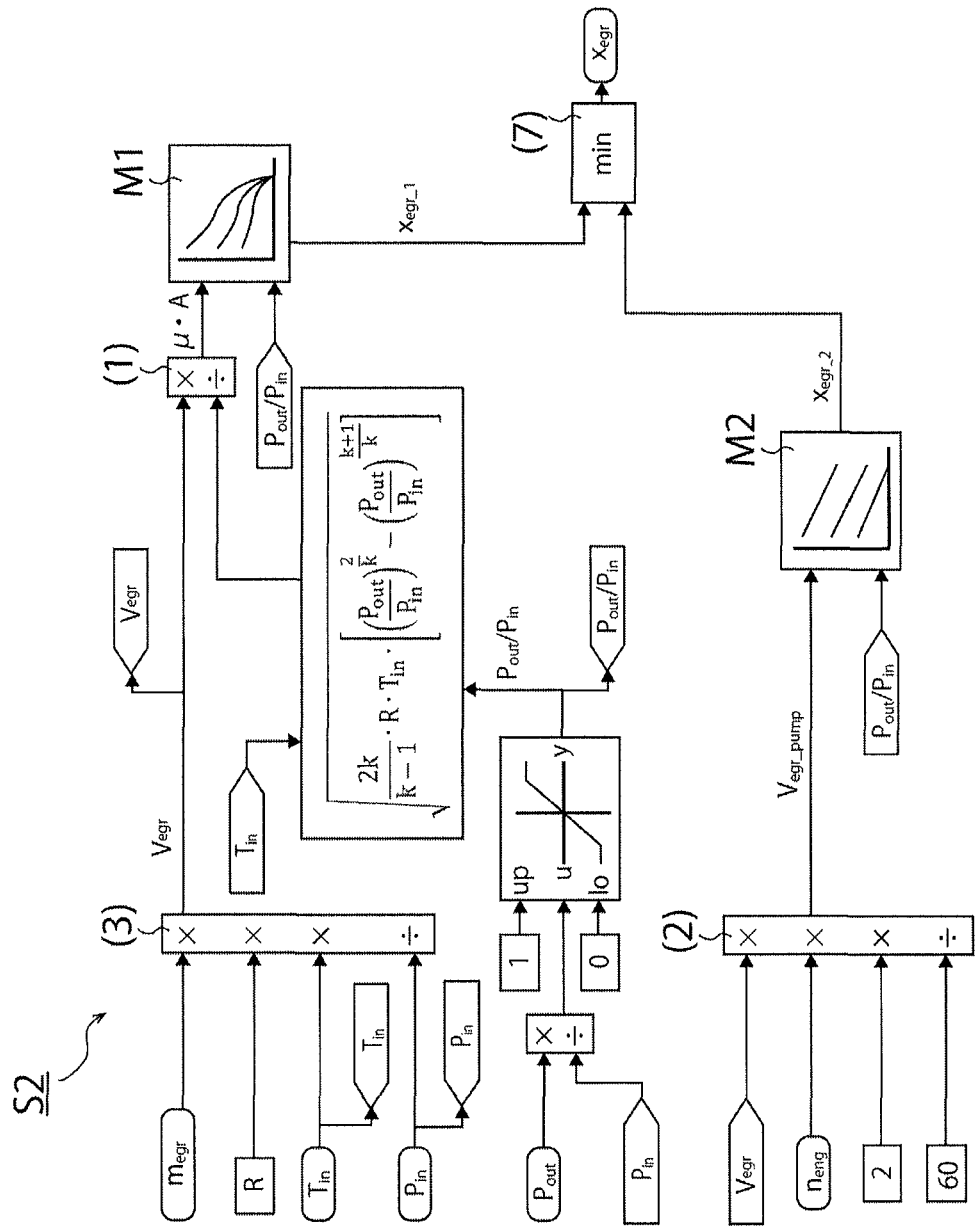
FIG. 7 is a block diagram illustrating an opening degree calculation model of the EGR valve of the internal combustion engine of the embodiment according to the present invention.

First, in this opening-degree calculation model S2, as illustrated in FIG. 7, the mass flow rate $m_{egr}$ of the EGR gas, the pressure $P_{out}$ at the outlet of the EGR valve 12 detected by the second pressure sensor 22, the pressure $P_{in}$ at the inlet of the EGR valve 12 detected by the first pressure sensor 21, the temperature $T_{in}$ at the inlet of the EGR valve 12 detected by the first temperature sensor 23, and the engine speed $n_{eng}$ detected by the crank angle sensor 27 are inputted. Subsequently, the volume flow rate $V_{egr}$ of the EGR gas is calculated from the Formula (3). This volume flow rate $V_{egr}$ of the EGR gas is made the first volume flow rate $V_1$ and the second volume flow rate $V_e$, respectively.

Subsequently, by using the first volume flow rate $V_1$ and from the Formula (1), the coefficient μ·A of the isentropic flow equation of the nozzle is calculated. Subsequently, by referring to the first opening map M1, the first target opening degree $x_{egr\_1}$ of the EGR valve 12 according to the coefficient μ·A and the pressure ratio $P_{out}/P_{in}$ at the inlet/outlet of the EGR valve 12 is calculated.

On the other hand, by using the second volume flow rate $V_2$ and from the Formula (2), the pumped-out volume flow rate $V_{egr\_pump}$ of the EGR gas per cylinder is calculated. Subsequently, by referring to the second opening map M2, the second target opening degree $x_{egr\_2}$ of the EGR valve 12 according to pumped-out volume flow rate $V_{egr\_pump}$ of the EGR gas per cylinder and the pressure ratio $P_{out}/P_{in}$ at the inlet/outlet of the EGR valve 12 is calculated.

Subsequently, the smaller one of the first target opening degree $x_{egr\_1}$ and the second target opening degree $x_{egr\_2}$ is made the opening degree $x_{egr}$ of the EGR valve 12 from the following Formula (7).

[Formula 7]

$$x_{egr}=\min(x_{egr\_1},x_{egr\_2}) \quad (7)$$

As a result, since the opening degree $x_{egr}$ of the EGR valve 12 can be calculated accurately from the required mass flow rate $m_{egr}$ of the EGR gas, it can be applied to a control of the EGR valve 12 having the EGR valve opening-degree calculation model S2, whereby controllability can be improved. Moreover, this EGR valve opening-degree calculation model S2 is obtained by converting the above-described mass flow rate calculation model S1 of the EGR gas to a reverse model and can be acquired easily.

For example, in control of the EGR system 10 having the NOx exhaust amount $m_{NOx}$ detected by the NOx sensor 26 as a control amount, it is assumed that the target value is set as a target intake oxygen concentration $m_{o2\_dem}$ that can suppress the NOx exhaust amount $m_{NOx}$, and the intake air amount $m_{air}$ detected by the MAF sensor 25 is used as detectable physical amount.

The mass flow rate $m_{egr}$ of the required EGR gas is calculated in accordance with the value of the changed intake air amount $m_{air}$ so that the target intake oxygen concentration $m_{o2\_dem}$ does not change in accordance with the change of the intake air amount $m_{air}$ detected by the MAF sensor 25, and the opening degree of the EGR valve 12 calculated from the mass flow rate $m_{egr}$ is controlled to the opening degree $x_{egr}$.

By means of the above-described operation, the EGR valve 12 is controlled in accordance with the target value of the state amount (NOx exhaust amount, for example) of the engine 1, and the EGR system 10 can be feed-forward controlled so that the detectable physical amount changing by a disturbance at that time is not changed from the predetermined target value of the physical amount, whereby controllability of the EGR system 10 can be improved.

Subsequently, one example of the control method for the internal combustion engine of the embodiment according to the present invention will be explained by referring to FIG. 8. The method for controlling the opening degree of the EGR valve 12 illustrated in FIG. 8 is an EGR control using the NOx exhaust amount as a control amount and is a method for controlling the opening degree of the EGR valve 12 by the feedback control (also called PID control) and the feed-forward control.

Figure 6:
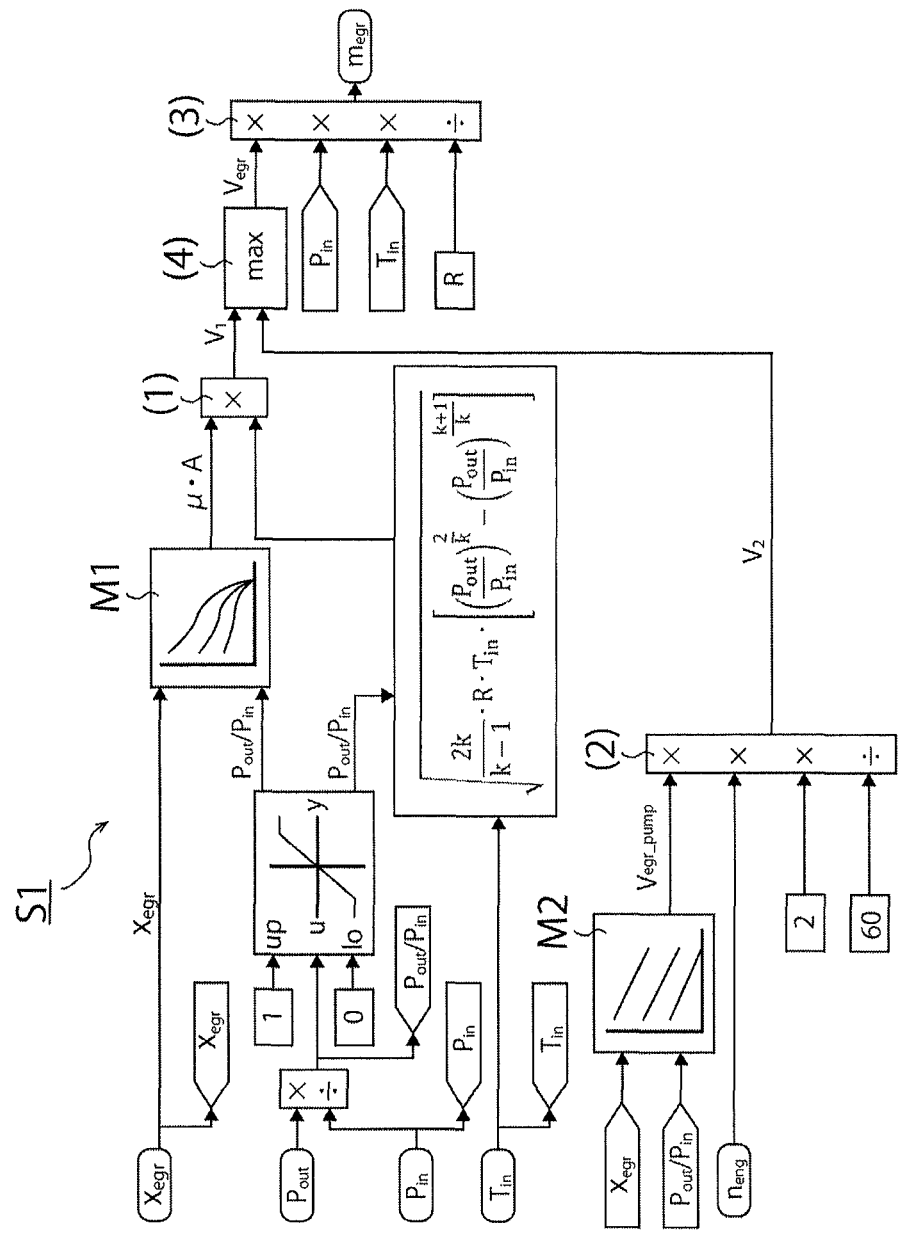
FIG. 6 is a block diagram illustrating a mass flow rate calculation model of the EGR gas of the internal combustion engine of the embodiment according to the present invention.
Figure 8:
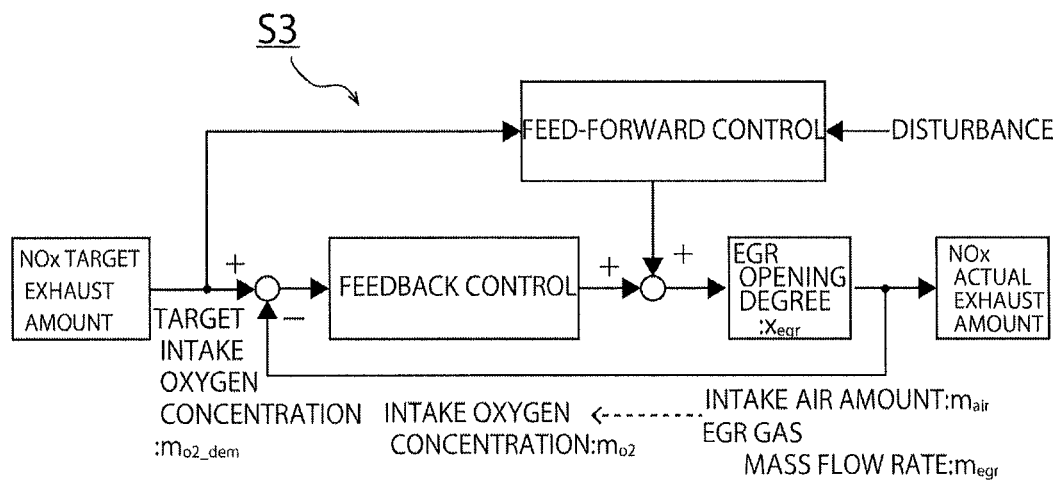
FIG. 8 is a block diagram illustrating an EGR control of the internal combustion engine of the embodiment according to the present invention.

In the feedback control using the EGR gas mass flow rate calculation model S1 illustrated in FIG. 6, the intake oxygen concentration $m_{o2}$ that can be calculated by using the intake air amount $m_{air}$ detected by the MAF sensor 25 and the mass flow rate $m_{egr}$ of the EGR gas is fed back as a detectable physical amount as illustrated in FIG. 8, and the opening degree of the EGR valve 12 is controlled so as to match the target intake oxygen concentration $m_{o2\_dem}$ as a predetermined physical amount. As a result, a difference between the target exhaust amount and the actual exhaust amount of NOx can be adjusted.

Moreover, in the feed-forward control using the EGR valve opening-degree calculation model S2 illustrated in FIG. 7, if a disturbance (here, it refers to a change of an intake air amount or the like) occurs as illustrated in FIG. 8, the required mass flow rate $m_{egr}$ of the EGR gas is calculated from the target intake oxygen concentration $m_{o2\_dem}$ and the changed intake air amount $m_{air}$, and the opening degree $x_{egr}$ of the EGR valve 12 is controlled from the required mass flow rate $m_{egr}$. As a result, adjustment can be made so that the difference between the target exhaust amount of NOX and the actual exhaust amount of NOx is not largely changed by the disturbance.

According to this control method, the EGR gas mass flow rate $m_{egr}$ can be accurately calculated from the opening degree $x_{egr}$ of the EGR valve 12 in the feedback control using the EGR gas mass flow rate calculation model S1, and an accurate numerical value can be fed back and thus, controllability of the EGR system 10 can be improved.

On the other hand, in the feed-forward control using the EGR valve opening-degree calculation model S2, the required EGR gas mass flow rate $m_{egr}$ can be acquired in accordance with the disturbance, the opening degree $x_{egr}$ of the EGR valve 12 can be accurately calculated from the mass flow rate $m_{egr}$, and the deviation between the target value and the actual value can be suppressed, and thus, controllability can be further improved.

In this embodiment, the control method using the exhaust amount of NOx as a control amount is explained as an example, but the present invention is not limited to that, and an air-fuel ratio or PM (particulate matter), for example, can be used as a control amount. Moreover, in addition to a control method combining the feedback control and the feed-forward control, the present invention can be applied to a control method of only the feedback-control, a cascade control having a plurality of feedback controls function integrally and the like.

In addition, the EGR gas mass flow rate calculation model S1 using the above-described Formulas (1) to (6) or the EGR valve opening-degree calculation model S2 using the above-described Formulas (1) to (5) and (7) can be also applied easily to an engine without a reed valve, and controllability of the EGR valve 12 can be improved.

INDUSTRIAL APPLICABILITY

The internal combustion engine of the present invention can accurately calculate the mass flow rate of the EGR gas from the opening degree of the EGR valve and can accurately calculate the opening degree of the EGR valve from the mass flow rate of the EGR gas. As a result, since it can be applied to various control methods such as the feedback control, the feed-forward control and the like so as to improve controllability of the EGR system, it can be used particularly in a vehicle such as a truck on which an engine provided with an EGR system having a reed valve in an EGR passage and the like is mounted.

The invention claimed is:

1. An internal combustion engine including an EGR system having an EGR valve and a check valve in an EGR passage, wherein, the internal combustion engine comprises:
a control device expressing a relationship between an opening degree of the EGR valve and a mass flow rate of an EGR gas by using a first volume flow rate of the EGR gas that can be expressed by using an isentropic flow equation of a nozzle of the EGR valve and a second volume flow rate of the EGR gas pumped out by the check valve.

2. The internal combustion engine according to claim 1, wherein
the control device is provided with the following Formula (1) which expresses the first volume flow rate ($V_1$) and is obtained by dividing the isentropic flow equation of the nozzle by a gas density, and the following Formula (2) which expresses the second volume flow rate ($V_2$) and is obtained by multiplying an EGR gas pumped-out volume flow rate ($V_{egr\_pump}$) per cylinder by the number of differential pressure fluctuation times per unit time:

[Formula 1]

$$V_1 = \mu \cdot A \cdot \sqrt{\frac{2k}{k-1} \cdot R \cdot T_{in} \cdot \left[\left(\frac{P_{out}}{P_{in}}\right)^{\frac{2}{k}} - \left(\frac{P_{out}}{P_{in}}\right)^{\frac{k+1}{k}}\right]} \quad (1)$$

[Formula 2]

$$V_2 = V_{egr\_pump} \cdot \frac{n_{eng}}{60} \cdot \frac{B}{N_{cyl}} \quad (2)$$

where
μ: flow rate coefficient ([-])
A: effective opening area of EGR valve ([m²])
$P_{in}$: pressure at EGR valve inlet ([Pa])
$P_{out}$: pressure at EGR valve outlet ([Pa])
$T_{in}$: temperature at EGR valve inlet ([K])
R: gas specific heat ([J/kgK])
k: specific heat ratio ([-])
$n_{eng}$: engine speed ([rpm])

B: value acquired from crank type ([-])
$N_{cyl}$: number of cylinders ([-]).

3. The internal combustion engine according to claim 2, wherein
when the control device controls the EGR valve to an opening degree ($x_{egr}$) according to a target value of a state amount of the internal combustion engine,
the control device is provided with:
a first device configured to acquire a coefficient ($\mu \cdot A$) of the isentropic flow equation of the nozzle according to the opening degree ($x_{egr}$) and a current pressure ratio ($P_{out}/P_{in}$) from a first opening map of the EGR valve on the basis of the coefficient of the isentropic flow equation of the nozzle and before and after pressure ratios of the EGR valve and to calculate the first volume flow rate ($V_1$) from the Formula (1);
a second device configured to acquire a pumped-out volume flow rate ($V_{egr\_pump}$) of the EGR gas per cylinder of the internal combustion engine according to the opening degree ($x_{egr}$) and the current pressure ratio ($P_{out}/P_{in}$) from a second opening map of the EGR valve on the basis of the pumped-out volume flow rate of the EGR gas per cylinder and the before and after pressure ratios of the EGR valve and to calculate the second volume flow rate ($V_2$) from the Formula (2); and
after the first device and the second device, a third device configured to calculate the mass flow rate ($m_{egr}$) by multiplying the larger one of the first volume flow rate ($V_1$) and the second volume flow rate ($V_2$) by the gas density.

4. The internal combustion engine according to claim 2, wherein
when the control device controls the EGR valve so as to have a mass flow rate ($m_{egr}$) of the EGR gas according to a target value of a state amount of the internal combustion engine,
the control device is further provided with:
when the value calculated by dividing the mass flow rate ($m_{egr}$) by the gas density is used as the first volume flow rate ($V_1$) and the second volume flow rate ($V_2$)
a fourth device configured to acquire a first target opening degree ($x_{egr\_1}$) according to a coefficient ($\mu \cdot A$) of an isentropic flow equation of the nozzle calculated by the Formula (1) from the first volume flow rate ($V_1$) and the current pressure ratio ($P_{out}/P_{in}$) from a first opening map of the EGR valve on the basis of the coefficient of the isentropic flow equation of the nozzle and the before and after pressure ratios of the EGR valve;
a fifth device configured to acquire a second target opening degree ($x_{egr\_2}$) according to the pumped-out volume flow rate ($V_{egr\_pump}$) of the EGR gas per cylinder calculated by the Formula (2) from the second volume flow rate ($V_2$) and the current pressure ratio ($P_{out}/P_{in}$) from a second opening map of the EGR valve on the basis of the pumped-out volume flow rate of the EGR gas per cylinder and the before and after pressure ratios of the EGR valve; and
after the fourth device and the fifth device, a sixth device configured to set the smaller one of the first target opening degree ($x_{egr\_1}$) and the second target opening degree ($x_{egr\_2}$) to the opening degree ($x_{egr}$).

5. A control method for an internal combustion engine including an EGR system having an EGR valve and a check valve in an EGR passage, wherein
when a mass flow rate of an EGR gas is calculated from an opening degree of the EGR valve, or when the opening degree of the EGR valve is calculated from the mass flow rate, the control method uses a first volume flow rate of the EGR gas that can be expressed by using an isentropic flow equation of a nozzle of the EGR valve and a second volume flow rate of the EGR gas pumped out by the check valve.

6. The control method for an internal combustion engine according to claim 5, wherein
the first volume flow rate ($V_1$) is expressed by the following Formula (1) obtained by dividing an isentropic flow equation of the nozzle by a gas density; and
the second volume flow rate ($V_2$) is expressed by the following Formula (2) obtained by multiplying an EGR gas pumped-out volume flow rate ($V_{egr\_pump}$) per cylinder by the number of differential pressure fluctuation times per unit time:

[Formula 1]
$$V_1 = \mu \cdot A \cdot \sqrt{\frac{2k}{k-1} \cdot R \cdot T_{in} \cdot \left[\left(\frac{P_{out}}{P_{in}}\right)^{\frac{2}{k}} - \left(\frac{P_{out}}{P_{in}}\right)^{\frac{k+1}{k}}\right]} \quad (1)$$

[Formula 2]
$$V_2 = V_{egr\_pump} \cdot \frac{n_{eng}}{60} \cdot \frac{B}{N_{cyl}} \quad (2)$$

where
$\mu$: flow rate coefficient (H)
A: effective opening area of EGR valve ([m$^2$])
$P_{in}$: pressure at EGR valve inlet ([Pa])
$P_{out}$: pressure at EGR valve outlet ([Pa])
$T_{in}$: temperature at EGR valve inlet ([K])
R: gas specific heat ([J/kgK])
k: specific heat ratio ([-])
$n_{eng}$: engine speed ([rpm])
B: value acquired from crank type ([-])
$N_{cyl}$: number of cylinders ([-]).

7. The control method for an internal combustion engine according to claim 6, wherein
when the control method controls the EGR valve to an opening degree ($x_{egr}$) according to a target value of a state amount of the internal combustion engine,
the control method comprises:
a first step of acquiring a coefficient ($\mu \cdot A$) of an isentropic flow equation of the nozzle according to the opening degree ($x_{egr}$) and a current pressure ratio ($P_{out}/P_{in}$) from a first opening map of the EGR valve on the basis of the coefficient of the isentropic flow equation of the nozzle and the before and after pressure ratios of the EGR valve and to calculate the first volume flow rate ($V_1$) from the Formula (1);
a second step of acquiring a pumped-out volume flow rate ($V_{egr\_pump}$) of the EGR gas per cylinder of the internal combustion engine according to the opening degree ($x_{egr}$) and the current pressure ratio ($P_{out}/P_{in}$) from a second opening map of the EGR valve on the basis of the pumped-out volume flow rate of the EGR gas per cylinder and the before and after pressure ratios of the EGR valve and to calculate the second volume flow rate ($V_2$) from the Formula (2); and
after the first step and the second step, a third step of calculating the mass flow rate ($m_{egr}$) by multiplying the larger one of the first volume flow rate ($V_1$) and the second volume flow rate ($V_2$) by the gas density.

8. The control method for an internal combustion engine according to claim 6, wherein
when the control method controls the EGR valve so as to have a mass flow rate ($m_{egr}$) of the EGR gas according to a target value of a state amount of the internal combustion engine,
the control method further comprises:
when the value calculated by dividing the mass flow rate ($m_{egr}$) by the gas density is used as the first volume flow rate ($V_1$) and the second volume flow rate ($V_2$),
a fourth step of acquiring a first target opening degree ($x_{egr\_1}$) according to a coefficient ($\mu \cdot A$) of an isentropic flow equation of the nozzle calculated by the Formula (1) from the first volume flow rate ($V_1$) and the current pressure ratio ($P_{out}/P_{in}$) from a first opening map of the EGR valve on the basis of the coefficient of the isentropic flow equation of the nozzle and the before and after pressure ratios of the EGR valve;
a fifth step of acquiring a second target opening degree ($x_{egr\_2}$) according to the pumped-out volume flow rate ($V_{egr\_pump}$) of the EGR gas per cylinder calculated by the Formula (2) from the second volume flow rate ($V_2$) and the current pressure ratio ($P_{out}/P_{in}$) from a second opening map of the EGR valve on the basis of the pumped-out volume flow rate of the EGR gas per cylinder and the before and after pressure ratios of the EGR valve; and
after the fourth step and the fifth step, a sixth step of setting the smaller one of the first target opening degree ($x_{egr\_1}$) and the second target opening degree ($x_{egr\_2}$) to the opening degree ($x_{egr}$).

\* \* \* \* \*